United States Patent
Ogden

(10) Patent No.: US 7,285,167 B2
(45) Date of Patent: Oct. 23, 2007

(54) FIBER REINFORCED CONCRETE/CEMENT PRODUCTS AND METHOD OF PREPARATION

(75) Inventor: J Herbert Ogden, Valley Forge, PA (US)

(73) Assignee: Ogden Technologies, Inc., Valley Forge, PA (US)

( * ) Notice: Subject to any disclaimer, the term of this patent is extended or adjusted under 35 U.S.C. 154(b) by 0 days.

(21) Appl. No.: 10/962,187

(22) Filed: Oct. 7, 2004

(65) Prior Publication Data

US 2005/0155523 A1 Jul. 21, 2005

Related U.S. Application Data

(60) Provisional application No. 60/509,602, filed on Oct. 8, 2003.

(51) Int. Cl.
*C04B 14/38* (2006.01)
*C04B 14/36* (2006.01)

(52) U.S. Cl. ............ 106/814; 106/671; 106/717; 106/724; 106/790; 106/802; 106/819

(58) Field of Classification Search ............ 106/671, 106/717, 724, 790, 802, 814, 819
See application file for complete search history.

(56) References Cited

U.S. PATENT DOCUMENTS

| | | | |
|---|---|---|---|
| 5,366,600 A * | 11/1994 | Westhof et al. | 205/734 |
| 5,422,174 A * | 6/1995 | Shintani et al. | 428/320.2 |
| 5,685,902 A * | 11/1997 | Tezuka et al. | 106/643 |
| 5,836,715 A | 11/1998 | Hendrix | |
| 6,263,629 B1 | 7/2001 | Brown, Jr. | |
| 6,962,201 B2 * | 11/2005 | Brothers | 166/293 |

FOREIGN PATENT DOCUMENTS

| | | | |
|---|---|---|---|
| EP | 288070 A2 * | 10/1988 | |
| JP | 55-166877 A * | 12/1980 | |
| JP | 62-226850 A * | 5/1987 | |
| JP | 2-69207 A * | 3/1990 | |
| JP | 02-275739 A * | 11/1990 | |
| JP | 3-150241 A * | 6/1991 | |
| JP | 3-185176 A * | 8/1991 | |
| JP | 3-193645 A * | 8/1991 | |
| JP | 07-66584 A * | 3/1995 | |
| JP | 8-325050 A * | 12/1996 | |

OTHER PUBLICATIONS

Derwent Abstract No. 1982-03825J. abstract of Japanese Patent Specification No. 82-051703B (Nov. 1982).*
Derwent Abstract No. 1983-03709k. abstract of Japanese Patent Specification No. 82-059635B (Nov. 1982).*
Derwent Abstract No. 2002-104044, abstract of Korean Patent Specification No. 341020B (Jun. 2002).*
Photographs/diagram with captions "Wrapping bridge pier with carbon fiber fabric" "Finished patch" (unknown author and unknown date).

* cited by examiner

*Primary Examiner*—Anthony J. Green
(74) *Attorney, Agent, or Firm*—Reed Smith, LLP; Nanda P.B.A. Kumar

(57) ABSTRACT

Concrete and/or cement products and mixes with reinforcing carbon graphite fibers having a length of about 2½ inches to about 3½ inches, and/or nano and/or micron sized carbon fibers, and a method of reinforcing concrete.

58 Claims, 1 Drawing Sheet

FIBER REINFORCED CONCRETE/CEMENT PRODUCTS AND METHOD OF PREPARATION

This application claims the benefit of U.S. Provisional Patent Application Ser. No. 60/509,602 filed Oct. 8, 2003, and the text of U.S. Provisional Patent Application Ser. No. 60/509,602 is incorporated by reference in its entirety herewith.

BACKGROUND OF THE INVENTION

1. Field of the Invention

The invention relates to concrete products, and specifically concrete products reinforced with carbon graphite fibers.

2. Background of the Invention

Concrete is used for a wide variety of purposes, including road and bridge building, and, in particular, for the supports of elevated road beds and highways, as well as pilings and pillars. Concrete also has uses in building structures such as skyscrapers, high rises, including commercial as well as residential applications. Concrete may be prepared as a mixture to which water may be added. This permits concrete to be poured and formed on site. Alternately, concrete may be preformed and supplied in structures which may be moved into position, or, if heavy, lifted by a crane.

In addition, concrete, by its nature, has been known to undergo degradation, deterioration, crumbling, cracking, as well as separation of the concrete matrix. This can occur over time or by exposure to extreme or repeated weather or other environmental conditions. Stresses, such as wear, movement, vibrations and the like may also contribute to the aforementioned problems associated with concrete. It has been known in the art to install carbon in a concrete product in the form of a filament or tow (i.e., a continuous yarn). These filaments, however, still do not solve the problem as they are tight and unable to be penetrated. Thus, there is no way to bond a carbon filament yarn properly without some separation from the concrete structure. Other prior attempts to reinforce concrete include fiberglass, polymers and steel.

A need exists for a way to reinforce the concrete to alleviate known problems and improve the life and function of the concrete.

SUMMARY OF THE INVENTION

Reinforced concrete products and a method for producing reinforced concrete products are provided by the invention. It is an object of the present invention to provide concrete products and a method for producing concrete products, wherein the concrete products exhibit improved flexural properties, in particular, deflection properties and improved ductility. Another object of the present invention is to provide a concrete product with a matrix having improved strength, including high impact resistance properties. These and other objects are provided by my invention.

In one preferred embodiment, the invention comprises concrete having small (e.g., nano sized) carbon graphite fibers evenly dispersed throughout the concrete matrix. Voids in the concrete are filled by these carbon graphite fibers. The carbon fibers aid in preventing the propagation of micro cracks in concrete. By filling the microscopic voids using the small carbon fiber particles dispersed evenly throughout the concrete matrix, cracks are minimized as the energy is deflected and dissipated during the propagation. In addition, the carbon fibers increase the mass of the concrete matrix. The increase in mass facilitates improvement of the overall strength of the concrete product and also facilitates the prevention of the deterioration of the concrete matrix. Preferably, the carbon graphite fibers may have about a 500,000-pound tensile strength and about 32-million-modulus. Generally, improvement of the tensile strength, toughness and impact strength of the concrete matrix for concrete products of the invention by about 300% in flexibility and 500% in deflection may be realized. Also, filling the microscopic voids in the concrete with micron and/or nano sized carbon fibers increases the density of the concrete product, which decreases the permeability of the concrete product and thereby helps prevent water degradation of the cement product.

In a preferred embodiment of the invention, the present invention comprises concrete having about 2½ inch long to about 3½ inch long carbon graphite fibers evenly dispersed throughout the concrete matrix, with carbon fibers of about 3 inches in length being most preferred. In accordance with the invention, the inclusion of the carbon graphite fibers having lengths of about 2½ inches long to about 3½ inches long to cement improves the performance characteristics of the resulting concrete product with respect to degradation, deterioration, crumbling, cracking and separation, and the inclusion of such carbon graphite fibers to the concrete increases the post-cracking resistance of the resulting concrete product that helps prevent deteriorated concrete from separating. This embodiment provides concrete having very high abrasion resistance.

In another preferred embodiment of the invention, the invention comprises concrete having about 2½ inch long to about 3½ inch long carbon graphite fibers (about 3 inches in length being most preferred) evenly dispersed throughout the concrete matrix, and small (e.g. nano sized) carbon graphite fibers evenly dispersed throughout the concrete matrix.

In accordance with the invention, a method of reinforcing and improving the performance characteristics of concrete products comprises mixing (a) cement, (b) carbon graphite fibers having a length of about 2½ to 3½ inches, and/or nano sized and/or micron-sized carbon graphite fibers, (c) water, and optionally (d) slag and/or stone and/or sand and/or other aggregates together to form a slurry wherein the carbon graphite fibers are dispersed evenly throughout the slurry, and letting the slurry set in a form to cure the cement and form bonds between the cement and the carbon graphite fibers, thereby obtaining reinforced concrete. In a preferred embodiment, the method includes the step of texturing the carbon graphite fibers having a length of about 2½ inches to about 3½ inches when such fibers are used in the concrete by subjecting such fibers to a stream of hot pressurized air, and the step of coating the carbon graphite fibers having a length of about 2½ inches to about 3½ inches with a dispersing agent, such as, for example, a light epoxy compound.

The inclusion of carbon graphite fibers, in accordance with the invention, improves the strength, flexibility, toughness and weather or environmental properties of the concrete products. Concrete products of the present invention have improved flexural and deflection properties, improved impact strength and ductility, and improved permeability and compression properties.

The concrete products produced in accordance with the present invention may preferably include barriers, in particular, jersey barriers, and terrorist barriers. In addition, the concrete products produced in accordance with the invention may comprise bridge decks, pre-cast concrete structures, pavements, slabs-on-grade, pipes, wall and floor panels, post-tensioned beam anchorage zones, as well as other uses where traditional concrete products have been used. The concrete-products of the invention also have use in seismic applications.

As used herein, the reference to concrete products includes cement products, as well as other products comprising cement and aggregate.

DETAILED DESCRIPTION OF THE PREFERRED EMBODIMENTS

Figure 1:
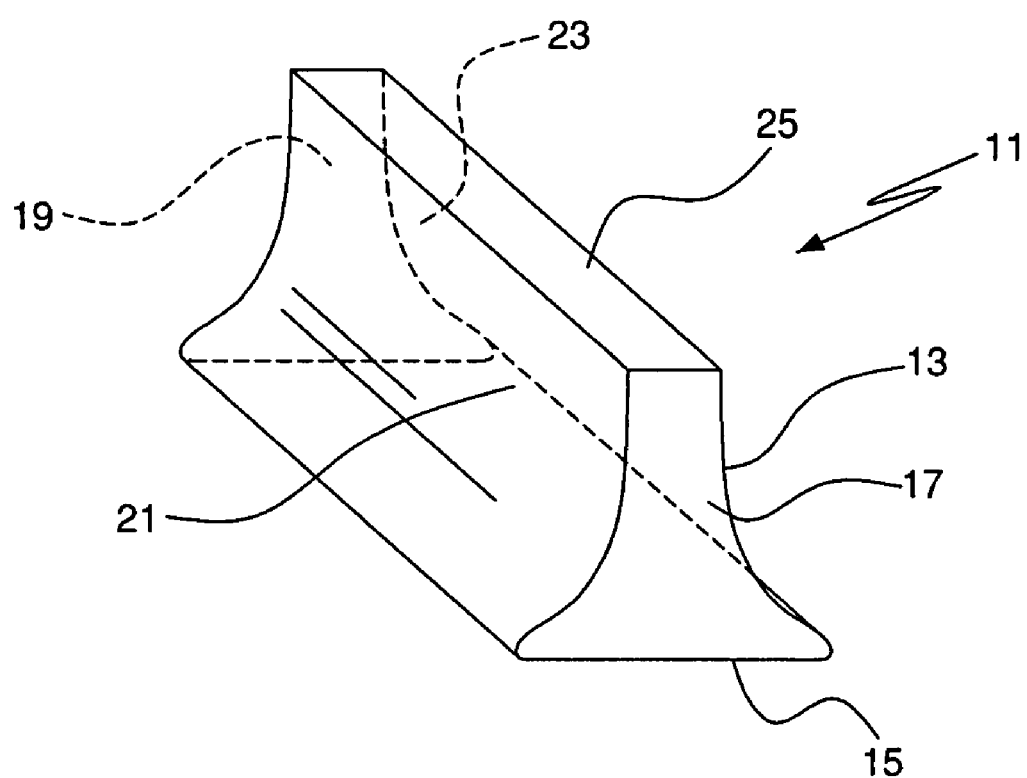
FIG. 1 is a view in perspective of a concrete product constructed in accordance with the invention.

A concrete product in accordance with the invention comprises concrete and carbon fibers.

The carbon fibers are in the form of (a) carbon graphite fibers having a length of about 2½ inches to about 3½ inches, preferably about 3 inches, and/or (b) micron and/or nano sized carbon graphite fibers. The carbon graphite fibers may be based, for example, upon pan carbon, pitch carbon, rayon and cotton carbon. Preferably, the carbon fibers have approximately 500,000-pound tensile strength and approximately 32-million-modulus.

Preferably, the concrete is made from cement, such as Portland cement, or a mix comprising cement, such as Portland cement, and slag and/or stone and/or sand and/or other aggregates. Alternately, the concrete may comprise Portland cement concrete without the further addition of aggregate.

The invention also includes a concrete mix comprising (a) cement, preferably Portland cement (b) carbon graphite fibers having a length of about 2½ inches to about 3½ inches, preferably about 3 inches, and/or micron and/or nano sized carbon graphite fibers, and optionally (c) slag and/or stone and/or sand and/or other aggregates.

Concrete may be varied in composition so as to provide the desired characteristic properties required for a particular application. For example, a concrete slurry in accordance with the invention may contain 10 to 18% cement, 60 to 80% aggregate, 15 to 20% water, and 0.5 to 2% carbon fibers. Entrained air in the slurry may take up to about 8%. Additionally, in accordance with the invention, concrete slurries having different percentages of components than those percentages of the example of this paragraph are included in this invention.

In a preferred embodiment of the invention, a concrete product is produced from a mixture comprising from about 97.5%-99% by weight of cement, and from about 1% to about 2% fibers. Alternately, slag may be added to the mixture, with the slag component being present in an amount of up to about 25% by weight of the mixture, the fiber content preferably in an amount of from about 1% to about 2% by weight of the mixture, and the cement being present in an amount of from about 74% to 98%. In a particularly preferred embodiment, the slag is present in an amount of about 25% by weight, the cement is present in an amount of about 74% by weight, and 2½ inch to 3½ inch carbon fibers are present in an amount of about 1.5% by weight.

In a preferred embodiment, the carbon fibers having a length between about 2½ inches to about 3½ inches are evenly dispersed throughout the concrete matrix. Carbon graphite fibers having the length of about 2½ inches to about 3½ inches that are evenly dispersed in the concrete matrix facilitate the prevention of cracking and separation of the concrete matrix. When the carbon graphite fibers having a length of about 2½ inches to about 3½ inches are present in a concentration of about 1% to about 2% by weight of the concrete product, separating, cracking, and deteriorating of the concrete may be decreased by 250% to 500% compared with the prior art. Under tensile stresses, the fibers bridge the cracks and restrain the widening of the concrete by providing pullout resistance. The fibers lead to the improvement of the post peak ductility and toughness of the material. The formation of cracked systems in the cement is minimized or prevented, thus increasing the tensile strength on the overall toughness of the inventive composite material. The carbon fibers do not rust, have super tensile strength, and are inert to chemicals.

In preferred embodiments of the invention where the carbon fibers comprise carbon fibers having the length of about 2½ inches to about 3½ inches, the 2½ inch to 3½ inch fibers are provided in a range of about 1% to about 2% by weight of the concrete mix or concrete product, with 1.5% by weight of the concrete mix or concrete product being more preferred.

In another preferred embodiment, the invention comprises cement (preferably Portland cement), nano and/or micron sized carbon graphite fibers, and optionally slag and/or stone and/or sand and/or other aggregates. The density of the finished concrete matrix of a concrete product produced with the composition of the present invention may be increased through the addition of the nano or micron sized carbon particles, or mixtures of nano and micron sized particles.

The concrete products of the invention containing the micron and/or nano sized carbon graphite fibers have improved properties. For example, the inventive concrete products exhibit an increase in the flexibility of the concrete as well as an increase in the deflection of the concrete. When the carbon fibers are present at a concentration of about 0.5% to 2% by weight of the concrete product, the concrete flexibility is increased by about 300% and the concrete deflection is increased by about 500%. As little as about 0.5% concentration of the carbon graphite fibers in the concrete mix imparts beneficial improvements in strength to the resultant concrete products, and aids in minimizing some or all of the deficiencies (such as degradation, crumbling, cracking, and separating of the concrete matrix) observed with traditional concrete products. Abrasion and erosion are diminished with the interlocking of microscopic carbon graphite fibers. The fibers also extend the concrete fatigue lifetime. In preferred embodiments of the invention where the carbon fibers comprise nano sized fibers, the nano sized carbon fibers are provided in a range of about 0.5% to about 1% by weight of the concrete mix or concrete product, with 0.75% by weight of the concrete mix or concrete product being more preferred. In preferred embodiments of the invention where the carbon fibers comprise micron sized fibers, the micron sized carbon fibers are provided in a range of about 0.5% to about 1% by weight of the concrete mix or concrete product, with 0.75% by weight of the concrete mix or concrete product being more preferred. In preferred embodiments of the invention where the carbon fibers comprise a combination of nano sized fibers and micron sized fibers, the combination of nano sized carbon fibers and micron sized fibers is provided in a range of about 0.5% to about 1% by weight of the concrete mix or concrete product, with 0.75% by weight of the concrete mix or concrete product being more preferred.

In another preferred embodiment of the invention, the carbon fibers include 2½ inch to 3½ inch fiber lengths, and nano sized lengths or nano-fumes, which is about one billionth of a meter ($10^{-9}$ meters) or about 0.0000000001 meters to 400 microns. In further embodiments, the carbon fibers include (a) the 2½ inch to 3½ inch fiber lengths, and (b) micron sized carbon fibers or a combination of micron sized and nano sized fibers. The inclusion of the micron and/or nano sized particles may be done to improve permeability (thereby hindering water degradation) and compression of the finished concrete product. In preferred embodiments of the invention where the carbon fibers comprise a combination of 2½ inch to 3½ inch fibers and nano sized fibers, the 2½ inch to 3½ inch fibers are provided in a range of about 1% to about 2% by weight of the concrete mix or concrete product, with 1.5% by weight of the concrete mix or concrete product being more preferred, and the nano sized fibers are provided in a range of about 0.5% to about 1% by weight of the concrete mix or concrete product, with 0.75% by weight of the concrete mix or concrete product being more preferred. In preferred embodiments of the invention where the carbon fibers comprise a combination of 2½ inch to 3½ inch fibers are provided in a range of about 1% to about 2% by weight of the concrete mix or concrete product, with 1.5% by weight of the concrete mix or concrete product being more preferred, and the micron sized fibers are provided in a range of about 0.5% to about 1% by weight of the concrete mix or concrete product, with 0.75% by weights of the concrete mix or concrete product being more preferred. In preferred embodiments of the invention where the carbon fibers comprise a combination of 2½ inch to 3½ inch fibers and nano sized fibers and micron sized fibers, the 2½ inch to 3½ inch fibers are provided in a range of about 1% to about 2% by weight of the concrete mix or concrete product, with 1.5% by weight of the concrete mix or concrete product being more preferred, and the combination of nano sized fibers and micron sized fibers is provided in a range of about 0.5% to about 1% by weight of the concrete mix or concrete product, with 0.75% by weight of the concrete mix or concrete product being more preferred.

In each embodiment of the invention that includes carbon graphite fibers having a length of about 2½ inches to about 3½ inches as a component, the carbon graphite fibers having a length of about 2½ inches to 3½ inches preferable are texturized prior to being mixed with the cement to open up the fiber filaments to allow the cement to penetrate into the interstices of the fibers to permit the creation of a permanent bond between the cement and the fibers.

Also, in each embodiment of the invention that includes carbon graphite fibers having a length of about 2½ inches to about 3½ inches as a component, a dispersing agent is preferably used to facilitate even dispersion of the carbon graphite fibers having a length of about 2½ inches to about 3½ inches throughout the concrete mix and/or the concrete slurry. A preferred dispersing agent is a light epoxy compound which may be coated on the carbon fibers having a length of about 2½ inches to about 3½ inches. Preferably, the epoxy compound is coated on the carbon fibers having a length of about 2½ inches to about 3½ inches in an amount of about 0.3% to about 0.9% by weight of the carbon fibers, or in a sufficient amount to provide an adequate coating on the carbon fibers.

The following examples are illustrative of the invention.

EXAMPLE I

| Component | Weight | Percent by Weight |
|---|---|---|
| Cement | 800 lbs | 98.5% |
| 2½ in. to 3½ in. long fibers | 12 lbs | 1.5% |
| Total | 812 lbs | 100% |

The components are mixed together, and water is added to the dry mixture of components. The fibers comprise chopped carbon graphite fibers. Prior to mixing the carbon fibers with the cement, the carbon fibers are texturized by subjecting them to a pressurized stream of hot air to open the filaments in the fibers to allow the cement to penetrate into the interstices of the fiber and create a permanent bond between the cement and the fiber. Also, prior to mixing the carbon fibers with the cement, the carbon fibers after being subjected to the pressurized stream of hot air are coated with a light epoxy compound to provide rigidity to the fibers which facilitates the even dispersion of the fibers throughout the cement during mixing. A commercial blender, such as a rotary action mixer, may be used for the mixing.

The following Examples II to XVIII further illustrate the invention. In each example, the procedures set out in Example 1 are used, except if the components do not include carbon graphite fibers having a length of about 2½ inches to about 3½ inches, the texturizing step and epoxy coating step are skipped.

EXAMPLE II

| Component | Weight | Percent by Weight |
|---|---|---|
| Cement | 782 lbs | 97.75% |
| 2½ in. to 3½ in. long carbon graphite fibers | 12 lbs | 1.5% |
| Micron sized carbon graphite fibers | 6 lbs | 0.75% |
| Total | 800 lbs | 100% |

EXAMPLE III

| Component | Weight | Percent by Weight |
|---|---|---|
| Cement | 782 lbs | 97.75% |
| 2½ in. to 3½ in. long carbon graphite fibers | 12 lbs | 1.5% |
| Nano sized carbon graphite fibers | 6 lbs | 0.75% |
| Total | 800 lbs | 100% |

EXAMPLE IV

| Component | Weight | Percent by Weight |
|---|---|---|
| Cement | 782 lbs | 97.75% |
| 2½ in. to 3½ in. long carbon graphite fibers | 12 lbs | 1.5% |
| Micron sized carbon graphite fibers | 3.2 lbs | 0.4% |
| Nano sized carbon graphite fibers | 2.8 lbs | 0.35% |
| Total | 800 lbs | 100% |

EXAMPLE V

| Component | Weight | Percent by Weight |
|---|---|---|
| Cement | 600 lbs | 73.9% |
| Slag | 200 lbs | 24.6% |
| 2½ in. to 3½ in. long carbon graphite fibers | 12 lbs | 1.5% |
| Total | 812 lbs | 100% |

EXAMPLE VI

| Component | Weight | Percent by Weight |
|---|---|---|
| Cement | 600 lbs | 75% |
| Slag | 182 lbs | 22.75% |
| 2½ in. to 3½ in. long carbon graphite fibers | 12 lbs | 1.5% |
| Nano sized carbon graphite fibers | 6 lbs | 0.75% |
| Total | 800 lbs | 100% |

EXAMPLE VII

| Component | Weight | Percent by Weight |
|---|---|---|
| Cement | 600 lbs | 75% |
| Slag | 182 lbs | 22.75% |
| 2½ in. to 3½ in. long carbon graphite fibers | 12 lbs | 1.5% |
| Micron sized carbon graphite fibers | 6 lbs | 0.75% |
| Total | 800 lbs | 100% |

EXAMPLE VIII

| Component | Weight | Percent by Weight |
|---|---|---|
| Cement | 600 lbs | 75% |
| Slag | 182 lbs | 22.75% |
| 2½ in. to 3½ in. long carbon graphite fibers | 12 lbs | 1.5% |
| Nano sized carbon graphite fibers | 6 lbs | 0.75% |
| Micron sized carbon graphite fibers | 3.2 lbs | |
| | 2.8 lbs | |
| Total | 800 lbs | 100% |

EXAMPLE IX

| Component | Weight | Percent by Weight |
|---|---|---|
| Cement | 800 lbs | 99.25% |
| Nano sized carbon graphite fibers | 6 lbs | 0.75% |
| Total | 806 lbs | 100% |

EXAMPLE X

| Component | Weight | Percent by Weight |
|---|---|---|
| Cement | 800 lbs | 99.25% |
| Micron sized carbon graphite fibers | 6 lbs | 0.75% |
| Total | 806 lbs | 100% |

EXAMPLE XI

| Component | Weight | Percent by Weight |
|---|---|---|
| Cement | 600 lbs | 73.9% |
| Slag | 205 lbs | 25.2% |
| Nano sized carbon graphite fibers | 7 lbs | 0.86% |
| Total | 812 lbs | 100% |

EXAMPLE XII

| Component | Weight | Percent by Weight |
|---|---|---|
| Cement | 600 lbs | 73.9% |
| Slag | 205 lbs | 25.2% |

-continued

| Component | Weight | Percent by Weight |
|---|---|---|
| Micron sized carbon graphite fibers | 7 lbs | 0.86% |
| Total | 812 lbs | 100% |

EXAMPLE XIII

| Component | Weight | Percent by Weight |
|---|---|---|
| Cement | 600 lbs | 16% |
| Slag | 200 lbs | 5% |
| Nano sized carbon graphite fibers | 56 lbs | 1% |
| Stone | 1,864 lbs | 49% |
| Sand | 1,108 lbs | 29% |
| Total Weight: | 3,828 lbs | 100% |

EXAMPLE XIV

| Component | Weight | Percent by Weight |
|---|---|---|
| Cement | 600 lbs | 16% |
| Slag | 200 lbs | 5% |
| Micron sized carbon graphite fibers | 56 lbs | 1% |
| Stone | 1,864 lbs | 49% |
| Sand | 1,108 lbs | 29% |
| Total Weight: | 3,828 lbs | 100% |

EXAMPLE XV

| Component | Weight | Percent by Weight |
|---|---|---|
| Cement | 600 lbs | 15.7% |
| Slag | 171.5 lbs | 4.5% |
| 2½ in. to 3½ in. long carbon graphite fibers | 67.5 lbs | 1.8% |
| Stone | 1,864 lbs | 48.9% |
| Sand | 1,108 lbs | 29.1% |
| Total | 3,811 lbs | 100% |

EXAMPLE XVI

| Component | Weight | Percent by Weight |
|---|---|---|
| Cement | 600 lbs | 15.7% |
| Slag | 171.5 lbs | 4.5% |
| 2½ in. to 3½ in. long carbon graphite fibers | 39 lbs | 1% |

-continued

| Component | Weight | Percent by Weight |
|---|---|---|
| Nano sized carbon graphite fibers | 28.5 lbs | 0.8% |
| Stone | 1,864 lbs | 48.9% |
| Sand | 1,108 lbs | 29.1% |
| Total | 3,811 lbs | 100% |

EXAMPLE XVII

| Component | Weight | Percent by Weight |
|---|---|---|
| Cement | 600 lbs | 15.7% |
| Slag | 171.5 lbs | 4.5% |
| 2½ in. to 3½ in. long carbon graphite fibers | 39 lbs | 1% |
| Micron sized carbon graphite fibers | 28.5 lbs | 0.8% |
| Stone | 1,864 lbs | 48.9% |
| Sand | 1,108 lbs | 29.1% |
| Total | 3,811 lbs | 100% |

EXAMPLE XVIII

| Component | Weight | Percent by Weight |
|---|---|---|
| Cement | 600 lbs | 15.7% |
| Slag | 171.5 lbs | 4.5% |
| 2½ in. to 3½ in. long carbon graphite fibers | 39 lbs | 1% |
| Micron sized carbon graphite fibers | 14.24 lbs | 0.4% |
| Nano sized carbon graphite fibers | 14.25 lbs | 0.4% |
| Stone | 1,864 lbs | 48.9% |
| Sand | 1,108 lbs | 29.1% |
| Total | 3,811 lbs | 100% |

Alternatively, in accordance with other embodiments of the invention, although not as effective, silica fumes or the combination of silica fumes and micron and/or nano sized carbon graphite fibers may be used in place of micron and/or nano sized carbon graphite fibers in the same concentrations used in the embodiments of the invention which contain micron and/or nano sized carbon graphite fibers set out above, and which also contain the 2½ inch to 3½ inch carbon fibers.

In accordance with the method of the invention, the components are mixed together, and to the dry mixture of components is added water (about 20% by weight) to form a concrete composition ready to be used that has greater strength, flexibility, toughness, and weather or environmental resistance properties than concrete not having the carbon graphite fibers of the invention. The carbon fibers having a length of about 2½ to about 3½ inches, when used as a component of concrete, prior to mixing are preferably "opened up" by subjecting such carbon fibers to a texturizing step, such as by subjecting such carbon fibers to a stream of hot pressurized air. In addition, the method of reinforcing and improving the performance characteristics of concrete preferably includes the step of providing a dispersing agent when carbon graphite fibers having a length of about 2½ to about 3½ inches are used as a component of the concrete. Preferably, the dispersing agent is a light epoxy compound, and is used to provide a coating on the carbon fibers having a length of about 2½ to about 3½ inches prior to the introduction of such carbon fibers into the cement mix. The carbon fibers are mixed with the cement and any additional components, such as, for example, the slag (e.g., see Examples XI-XVIII), and a suitable amount of water is added to arrive at the consistency for a concrete slurry. Preferably, when 2½ to 3½ inch long fibers are used, mixing in a commercial blender is done without high pressure or a chopping action and is kept to a minimum to avoid damage to the fibers. When mixing in a mold or form, the fibers may be dispersed by direct spraying.

After the concrete slurry is created and is allowed to set in a form, the form is removed, and the result is a concrete product.

Turning to FIG. 1, there is shown a concrete product 11, in the form of a barrier, constructed in accordance with the invention. The concrete product 11 comprises a body 13 having a base 15, a front face 17, a rear face 19, side faces 21 and 23, and an upper end surface 25. Concrete products 11 are produced using the method set out above from (a) cement, preferably Portland cement, (b) carbon graphite fibers having a length of about 2½ inches to about 3½ inches (preferably about 3 inches), and/or micron and/or nano sized carbon graphite fibers, and optionally (c) slag and/or stone and/or sand and/or other aggregates. In alternative embodiments of the invention, the concrete products 11 are produced using the method set out above from (a) cement, preferably Portland cement, (b) silica fumes or silica fumes with carbon graphite fibers having a length of about 2½ to about 3½ inches (preferably 3 inches) and/or micron and/or nano sized carbon graphite fibers, and optionally (c) slag and/or stone and/or sand and/or other aggregates. Examples of the compositions of the concrete products 11 are given in Examples I to XVIII. With respect to the concrete products 11 that include silica fumes, the silica fumes or the combination of silica fumes and micron and/or nano sized carbon fibers may be used in place of the micron and/or nano sized carbon fibers in the same concentrations used in the embodiments of the invention set out above. The mixes of the compositions and/or products thereof may also be referred to as cement mixes or cement products.

The concrete products of the invention have improved performance characteristics over prior art concrete products. For example, the concrete products of the invention have improved overall strength. The overall strength is improved to provide the finished matrix of the concrete product with high impact and resistance properties.

The concrete products of the present invention include Jersey barriers and terrorist barriers, including panels. Among other products which may be produced in accordance with the present invention are included: precast (non-prestressed) panels, such as for example, tilt-up wall panels, floor panels, and the like), bridge decks, post-tensioned beam anchorage zones, pipes, slab-on-grade, seismic applications, as well as airstrip pavement.

The concrete products of the present invention may also be constructed to have improved hydration properties, in particular, when the nano sized fibers are used. The nano sized carbon fibers contribute to a strong pozzolanic reaction, wherein the cement gains hydrate and generates calcium hydroxide, which in turn reacts to create more calcium silicate hydrate. The nano fibers also facilitate the reduction of bleeding and the amount of surface areas in the mix, leading to a stronger matrix.

What is claimed is:

1. A concrete product comprising concrete and carbon fibers, wherein the carbon fibers comprise texturized carbon fibers coated with a dispersing agent.

2. The concrete product of claim 1, the texturized carbon fibers having a length of about 2½ inches to about 3½ inches.

3. The concrete product of claim 1, the texturized carbon fibers having a length of about 3 inches.

4. The concrete product of claim 1, wherein the dispersing agent comprises an epoxy compound.

5. The concrete product of claim 1, wherein the dispersing agent is present in an amount of from about 0.3% to about 0.9% of the carbon fiber.

6. The concrete product of claim 1, wherein said fibers are present in an amount of 1.5% by weight of the total mixture of dry ingredients forming the concrete product.

7. The concrete product of claim 1, wherein said fibers are present in an amount of from about 1% to 2% by weight of the total mixture of dry ingredients forming the concrete product.

8. The concrete product of claim 1, including slag.

9. The concrete product of claim 8, wherein the slag is present in an amount of greater than 0 to about 25% of the weight of the concrete product.

10. The concrete product of claim 1, wherein the carbon fibers comprise carbon fibers which have been treated with a pressurized stream of hot air.

11. The concrete product of claim 1, further including carbon fibers having a length of about $10^{-10}$ meters to 400 microns.

12. The concrete product of claim 1, further including slag, stone or sand or a combination thereof.

13. The concrete product of claim 1, further including a combination of carbon fibers having a length of about $10^{-10}$ meters to 400 microns and slag, stone or sand.

14. The concrete product of claim 11, the carbon fibers being present in an amount of about 1.5% to 3% by weight of the cement product.

15. The concrete product of claim 12, the carbon fiber being present in an amount of about 1.5% to 3% by weight of the cement product.

16. The concrete product of claim 13, the carbon fiber being present in an amount of about 1.5% to 3% by weight of the cement product.

17. The concrete product of claim 1, further including silica fumes.

18. The concrete product of claim 2, further including silica fumes.

19. The concrete product of claim 11, further including silica fumes.

20. The concrete product of claim 12, further including silica fumes.

21. The concrete product of claim 13, further including silica fumes.

22. The concrete product of claim 2, further including carbon fibers having a length of about $10^{-10}$ meters to 400 microns, silica fumes, or a combination thereof.

23. The concrete product of claim 2, further including carbon fibers having a length of about $10^{-10}$ meters to 400 microns.

24. A concrete product comprising concrete and carbon fibers, wherein the carbon fibers comprise carbon fibers which have been treated to open the fibers, and wherein the carbon fibers are coated with a dispersing agent.

25. The concrete product of claim 24, wherein the dispersing agent comprises an epoxy compound.

26. The concrete product of claim 24, the carbon fibers having a length of about 2½ inches to about 3½ inches.

27. The concrete product of claim 25, the carbon fibers having a length of about 2½ inches to about 3½ inches.

28. The concrete product of claim 26, further including carbon fibers having a length of about $10^{-10}$ meters to 400 microns.

29. A concrete mix comprising concrete and carbon fibers, wherein the carbon fibers comprise opened carbon fibers coated with a dispersing agent.

30. The concrete mix of claim 29, the carbon fibers having a length of about 2½ inches to about 3½ inches.

31. The concrete mix of claim 29, the carbon fibers having a length of about 3 inches.

32. The concrete mix of claim 29, including slag.

33. The concrete mix of claim 32, wherein the slag is present in an amount greater than 0 to about 25% of the weight of the concrete mix.

34. the concrete mix of claim 29, wherein the dispersing agent comprises an epoxy compound.

35. The concrete mix of claim 30, wherein the dispersing agent comprises an epoxy compound.

36. The concrete mix of claim 29, wherein the carbon fibers comprise fibers which have been treated with a pressurized stream of hot air.

37. The concrete mix of claim 30, further including carbon fibers having a length of about $10^{-10}$ meters to 400 microns.

38. The concrete mix of claim 29, further including carbon fibers having a length of about $10^{-10}$ meters to 400 microns.

39. The concrete mix of claim 29, further including slag, stone or sand or a combination thereof.

40. The concrete mix of claim 29, further including a combination of carbon fibers having a length of about $10^{-10}$ meters to 400 microns and slag, stone or sand.

41. The concrete mix of claim 29, further including silica fumes.

42. The concrete mix of claim 38, further including silica fumes.

43. The concrete mix of claim 39, further including silica fumes.

44. The concrete mix of claim 40, further including silica fumes.

45. The concrete mix of claim 30, further including carbon fibers having a length of about $10^{-10}$ meters to 400 microns, silica fumes, or a combination thereof.

46. A method of reinforcing concrete, comprising of steps of:
mixing cement, texturized carbon graphite fibers, and water together to form a slurry wherein the carbon graphite fibers are dispersed evenly throughout the cement, and
letting the slurry set in a form to cure the cement and form bonds between the cement and the carbon graphite fibers, thereby obtaining reinforced concrete.

47. The method of claim 46, the carbon fibers having a length of about 2½ inches to about 3½ inches.

48. The method of claim 46, further including the step of coating the carbon fibers with a dispersing agent before the carbon fibers are mixed with the concrete.

49. The method of claim 46, further including carbon fibers having a length of about $10^{-10}$ to meters to 400 microns being mixed into the slurry.

50. The method of claim 46, further including slag, stone or sand or a combination thereof being mixed into the slurry.

51. The method of claim 46, further including a combination of carbon fibers having a length of about $10^{-10}$ meters to 400 microns and slag, stone or sand being mixed into the slurry.

52. The method of claim 47, further including silica fumes being mixed into the slurry.

53. The method of claim 49, further including silica fumes being mixed into the slurry.

54. The method of claim 50, further including silica fumes being mixed into the slurry.

55. The method of claim 51, further including silica fumes being mixed into the slurry.

56. The method of claim 47, including carbon fibers having a length of about $10^{-10}$ meters to 400 microns, silica fumes, or a combination thereof being mixed into the slurry.

57. The method of claim 48, the dispersing agent comprising an epoxy compound.

58. The method of claim 47, further mixing carbon fibers having a length of about $10^{-10}$ meters to 400 microns into the slurry.

* * * * *